(12) United States Patent
Barr (10) Patent No.: US 6,813,221 B1
(45) Date of Patent: Nov. 2, 2004

(54) HOME CONTROL SYSTEM WITH AN INTERFACE ASSEMBLY

(76) Inventor: Craig Barr, 2925 Alta Ter., La Crescenta, CA (US) 91214

( * ) Notice: Subject to any disclaimer, the term of this patent is extended or adjusted under 35 U.S.C. 154(b) by 426 days.

(21) Appl. No.: 09/925,049

(22) Filed: Aug. 8, 2001

(51) Int. Cl.[7] .................. G08B 13/00; G08B 21/00; G10K 11/00; G06F 19/00
(52) U.S. Cl. ................. 367/198; 340/540; 340/541; 700/245
(58) Field of Search ................... 340/541, 540, 340/552; 700/245; 367/198

(56) References Cited

U.S. PATENT DOCUMENTS

| | | | | |
|---|---|---|---|---|
| 4,717,364 A | * | 1/1988 | Furukawa | 446/175 |
| 5,345,538 A | * | 9/1994 | Narayannan et al. | 704/275 |
| 5,541,585 A | * | 7/1996 | Duhame et al. | 340/5.62 |
| 5,668,929 A | * | 9/1997 | Foster, Jr. | 704/273 |
| 5,781,108 A | * | 7/1998 | Jacob et al. | 340/552 |

* cited by examiner

Primary Examiner—Michael Horabik
Assistant Examiner—Kimberly Hamilton
(74) Attorney, Agent, or Firm—Terry L. Miller (57) ABSTRACT

An interface assembly with an animated character/prop has at least one speaker for generating language and mechanisms for generating correlated movement. A logic controlling device has a plurality of inputs and outputs and is adapted to configure and synchronize message request signals from the various sensors, relays, thermostats, user controls and the like, with the appropriate audible words and movement commands from the generating devices as required to convey messages relating to the environment to the user. The interface assembly provides an audio component adapted to receive output signals from the logic controlling device to actuate the speaker. The interface assembly provides a movement component adapted to receive output signals from the logic controlling device to actuate the mechanisms for generating movement. The interface assembly provides a drive converter assembly operatively coupled to and adapted to convert and transfer signals between the movement component and the character/prop.

19 Claims, 9 Drawing Sheets

HOME CONTROL SYSTEM WITH AN INTERFACE ASSEMBLY

BACKGROUND OF THE INVENTION

1. Field of the Invention

The present invention relates to a home control system with an interface assembly and more particularly pertains to providing a speaking, moving, three dimensional animated character/prop operable in response to sensed signals.

2. Description of the Prior Art

The use of control system with an interface of known designs and configurations is known in the prior art. More specifically, control system with an interface of known designs and configurations previously devised and utilized for the purpose of method of responding to sensed signals through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,586,261 to Paine discloses a voice operated controller. U.S. Pat. No. 4,401,852 to Noso discloses a voice response control system. U.S. Pat. No. 5,920,477 to Hoffberg a discloses a human factored interface incorporating adaptive pattern recognition based controller apparatus. U.S. Pat. No. 4,797,924 to Schnars discloses a vehicle voice recognition method and apparatus. Lastly, U.S. Pat. No. 5,214,707 to Fujimoto discloses a control system for controlling equipment provide inside a vehicle utilizing a speech recognition apparatus.

While these devices fulfill their respective, particular objectives and requirements, the aforementioned patents do not describe a home control system with an interface assembly that allows providing a speaking, moving, three dimensional animated character/prop operable in response to sensed signals.

In this respect, the home control system with an interface assembly according to the present invention substantially departs from the conventional concepts and designs of the prior art, and in doing so provides an apparatus primarily developed for the purpose of providing a speaking, moving, three dimensional animated character/prop operable in response to sensed signals.

Therefore, it can be appreciated that there exists a continuing need for a new and improved home control system with an interface assembly which can be used for providing a speaking, moving, three dimensional animated character/prop operable in response to sensed signals. In this regard, the present invention substantially fulfills this need.

SUMMARY OF THE INVENTION

In view of the foregoing disadvantages inherent in the known types of control systems of known designs and configurations now present in the prior art, the present invention provides an improved home control system with an interface assembly. As such, the general purpose of the present invention, which will be described subsequently in greater detail, is to provide a new and improved home control system with an interface assembly and method which has all the advantages of the prior art and none of the disadvantages.

To attain this, the present invention essentially comprises a home control system with an interface assembly includes a three dimensional animatronic character/prop. The character/prop has a plurality of speakers, motors and actuators adapted to deliver system status messages and requested information to a user verbally as a function of the input signals as from a home control system. Secondly the home control system with interface assembly includes the home control system comprising a home security system and a home automation system. The home control system is adapted to control and maintain an environment associated with a building as well as survey for occurrences. The home control system has a plurality of inputs from the various sensors, relays, thermostats, user controls and the like. The home control system further has a plurality of outputs to convey messages relating to the environment to the user. Thirdly, the home control system with interface assembly includes a microphone operatively coupled to the home control system. The microphone is adapted to offer the user hands free operation or the home control system. Additional microphones found in the pre-existing home control system could provide further capabilities of the system to offer voice recognition. Next the home control system with interface assembly includes a logic controlling device. The logic controlling device has a plurality of inputs and a plurality of outputs. The logic controlling device is adapted to configure and synchronize message request signals from the home control system with the appropriate prerecorded audible words and movement commands from random access storage devices as required to convey messages relating to the environment to the user. The home control system with interface assembly includes a modem/network connection operatively coupled to the logic controlling device. The modem/network connection adapted to provide the user access to the worldwide web, email, networks and the like. An audio component is operatively coupled to the logic controlling device, the character/prop and a movement synthesizer whereby the audio component produces choreographed word phrases upon receipt of a signal from the logic controlling device and transmits the word phrases to the character/prop to perform. The audio component has text reading capabilities enabling it to convert text into words. The movement synthesizer is operatively coupled to the audio component and a drive converter assembly. The movement synthesizer is adapted to produce a choreographed command signal upon receipt of the word phrase. Finally, the home control system with interface assembly includes a drive converter assembly operatively coupled to the movement synthesizer and adapted to receive the command signals. The drive converter assembly is operatively coupled to the character/prop and adapted to transmit drive signals to the character/prop to perform.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved home control system with an interface assembly which has all of the advantages of the prior art control system of known designs and configurations and none of the disadvantages.

It is another object of the present invention to provide a new and improved home control system with an interface assembly which may be easily and efficiently manufactured and marketed.

It is further object of the present invention to provide a new and improved home control system with an interface assembly which is of durable and reliable constructions.

An even further object of the present invention is to provide a new and improved home control system with an interface assembly which is susceptible of a low cost of manufacture with regard to both materials and labor, and which accordingly is then susceptible of low prices of sale to the consuming public, thereby making such home control system with an interface assembly economically available to the buying public.

Even still, another object of the present invention is to provide a home control system with an interface assembly for providing a speaking, moving, three dimensional animated character/prop operable in response to sensed signals.

Lastly, it is an object of the present invention to provide a new and improved interface assembly with an animated character/prop. The animated character/prop has at least one speaker for generating language and mechanisms for generating movement, the language and movement being correlated. The interface assembly also provides a logic controlling device that has a plurality of inputs and a plurality of outputs. The logic controlling device is adapted to configure and synchronize message request signals from the various sensors, relays, thermostats, user controls and the like, with the appropriate audible words and movement commands from the generating devices as required to convey messages relating to the environment to the user. Thirdly, the interface assembly provides an audio component adapted to receive output signals form the logic controlling device to actuate the speaker. Fourthly, the interface assembly provides a movement component adapted to receive output signals from the logic controlling device to actuate the mechanisms for generating movement. Finally, the interface assembly has a drive converter assembly operatively coupled to, and adapted to convert and transfer signals between, the movement component and character/prop.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1A:
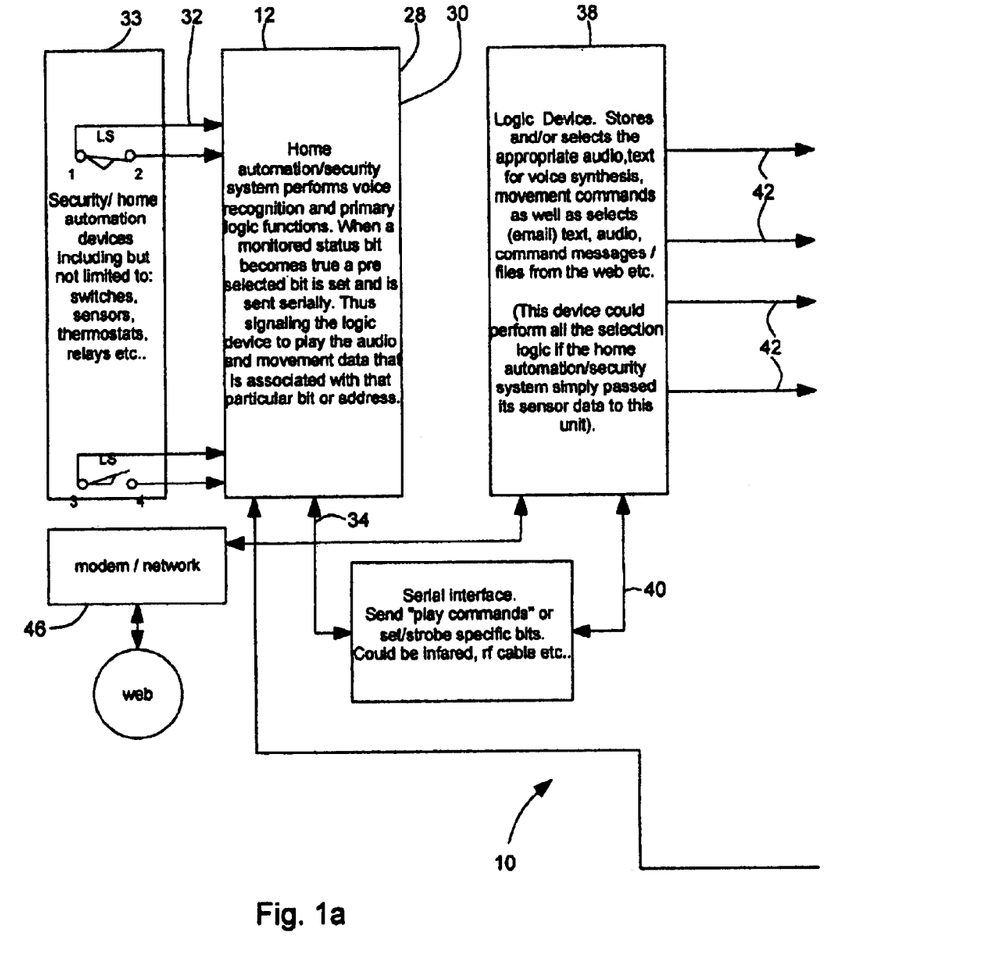
FIGS. 1A and 1B together form a block diagram of the preferred embodiment of the present invention.
Figure 1B:
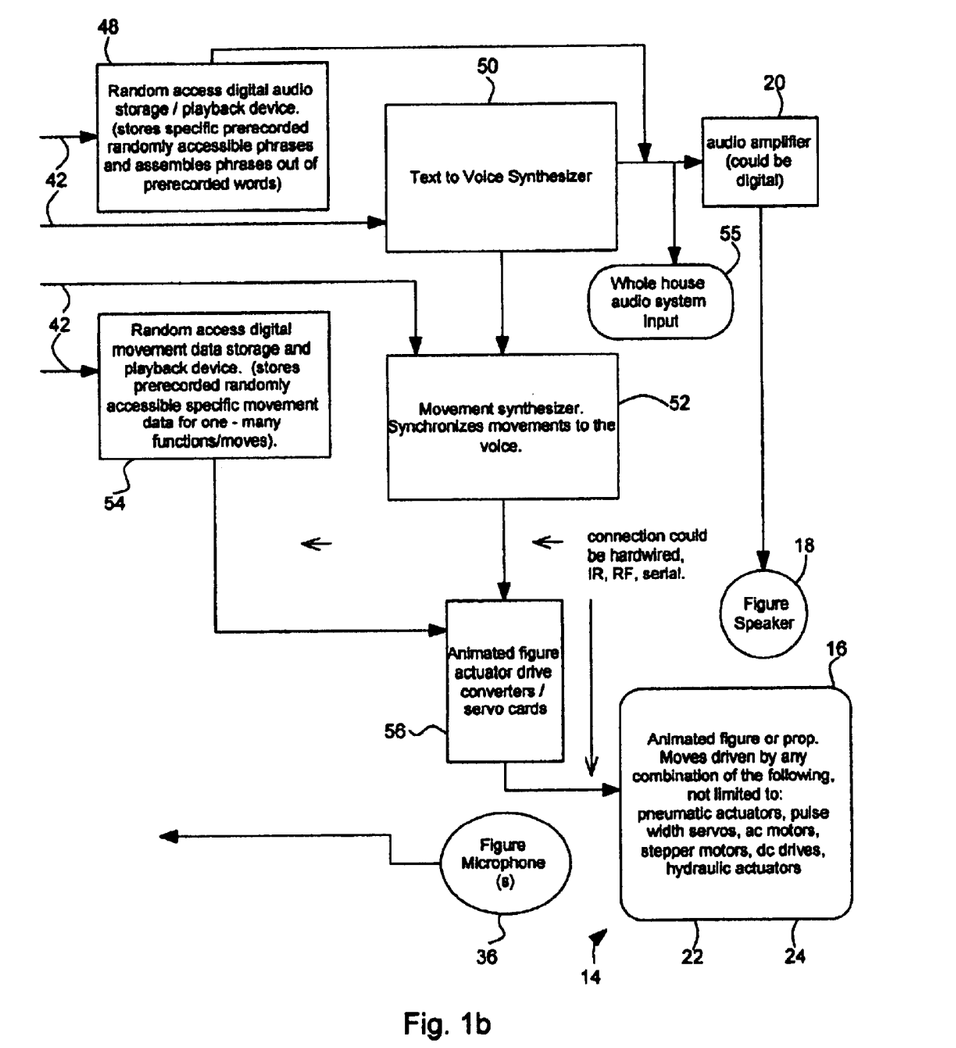

With reference now to the drawings, and in particular to FIG. 1 thereof (i.e., to parts 1a and 1b in conjunction), the preferred embodiment of the new and improved home control system 10 with an interface assembly 14 embodying the principles and concepts of the present invention will be described.

The present invention, the home control system 10 with an interface assembly 14 is comprised of a plurality of components. Such components in their broadest context include an interface Assembly 14, an animated character/prop 16, a logic controlling device, an audio component, a movement component and a drive converter, which are to be further described below. Such components are individually configured and correlated with respect to each other so as to attain the desired objective.

A home control system 10 with an interface assembly 14 includes a three dimensional animatronic character/prop 16. The character/prop 16 has a plurality of speakers 18 with amplifiers 20, motors 22 and actuators 24 adapted to deliver system status messages and requested information to a user verbally as a function of the input signals as from a home control system. The animated character 16 will not eliminate the use of noises, they can be coupled, such that special and individual messages could be preceded by a chirp or beep of a specific and individual tone. The home control system performs voice recognition and primary logic functions. The above described amplifier could have digital capabilities. The character/prop 16 could be driven by any combination, but not limited to any of the following: pneumatic actuators, pulse width servos, ac motors, stepper motors, dc drives, and hydraulic actuators. Also, the connections between the character/prop could be hardwired, Infrared (IR), Radio Frequency (RF), serial or the like.

Secondly, the home control system 10 with interface assembly 14 includes the home control system comprising a home security system 28 and a home automation system 30. The home control system 10 is adapted to control and maintain an environment associated with a building as well as survey for occurrences. The home control system has a plurality of inputs 32 from input devices 33 including various sensors, relays, thermostats, user controls and the like. The home control system further has a plurality of outputs 34 to convey messages relating to the environment to the user. Such outputs may be communicated to a variety or methods including but not limited to serial, parallel and discrete. Furthermore, such connection could be IR, RF, cable or the like. These outputs send play commands or set/strobe specific bits. When a monitored status bit becomes trues, a preselected bit is set and is sent to the outputs, thus signaling the logic device to play the audio and movement data that is associated with the particular bit or address.

Thirdly, the home control system with interface assembly includes a microphone 36 operatively coupled to the home control system. The microphone is adapted to offer the user hands free operation of the system. Additional microphones found in the pre-existing home control system could provide further capabilities of the system to offer voice recognition.

Next, the home control system with interface assembly includes a logic controlling device 38. The logic controlling device has an plurality of inputs 40 and a plurality of outputs 42. The logic controlling device adapted to configure and synchronize message request signals from the home control system with the appropriate prerecorded audible words and movement commands from random access storage devices as required to convey messages relating to the environment to the user. The logic controlling device stores and/or selects the appropriate audio/text for voice synthesis movement commands, as well as selects text, audio command messages/files from remote sources such as the web. One example of a text input could be email. This processor could perform all the selection logic if the home control system simply passed its sensor data to the logic controlling device. Such logic controlling device maybe either a processor or a circuit with logic capabilities to simulate desired effects. In an alternative embodiment the logic control device could perform all the selection logic if the home control system simply passed its sensor data to the logic control device first.

The home control system with interface assembly includes a modem/network connection 46 operatively coupled to the logic controlling device. The modem/network connection is adapted to provide the user access to the worldwide web, email, networks and the like. An audio component 48 is operatively coupled to the logic controlling device, to the character/prop and to a movement synthesizer 52 whereby the audio component produces choreographed word phrases upon receipt of a signal from the logic controlling device and transmits the word phrases to the character/prop to perform. The audio component may include a text to voice synthesizer 50 which has text reading capabilities enabling it to convert text into words. The logic controlling device may also be operatively coupled to a random access digital movement data storage device 54. Such a movement storage device 54 would store prerecorded randomly accessible specific movement data for one or many functions/moves. Similarly the audio component may consist of a random access digital audio storage/playback device which stores specific prerecorded randomly accessible phrases and assembles phrases out of prerecorded words. The various audio components may also be coupled to a whole-house audio system input 55.

Next, the home control system with interface assembly includes the movement synthesizer operatively coupled to the audio component and a drive converter assembly 56. The movement synthesizer is adapted to produce a choreographed command signal upon receipt of the word phrase.

Finally, the home control system with interface assembly includes the drive converter assembly operatively coupled to the movement synthesizer and adapted to receive the command signals. The drive converter assembly is operatively coupled to the character/prop and adapted to transmit drive signals to the character/prop to perform.

The animated character/prop may be in a variety of shape and sizes including but not limited to humanoid, robots, and animals. In particular the present invention could include a bird, more specifically a parrot in which its limbs and body are adapted to move in response to a movement component which includes a movement synthesizer and a movement storage device. In addition, the parrot's beak moves and the speakers play word phrases in synchronization in response to the audio component which can include a text-to-voice synthesizer and a voice storage device.

Figure 2:
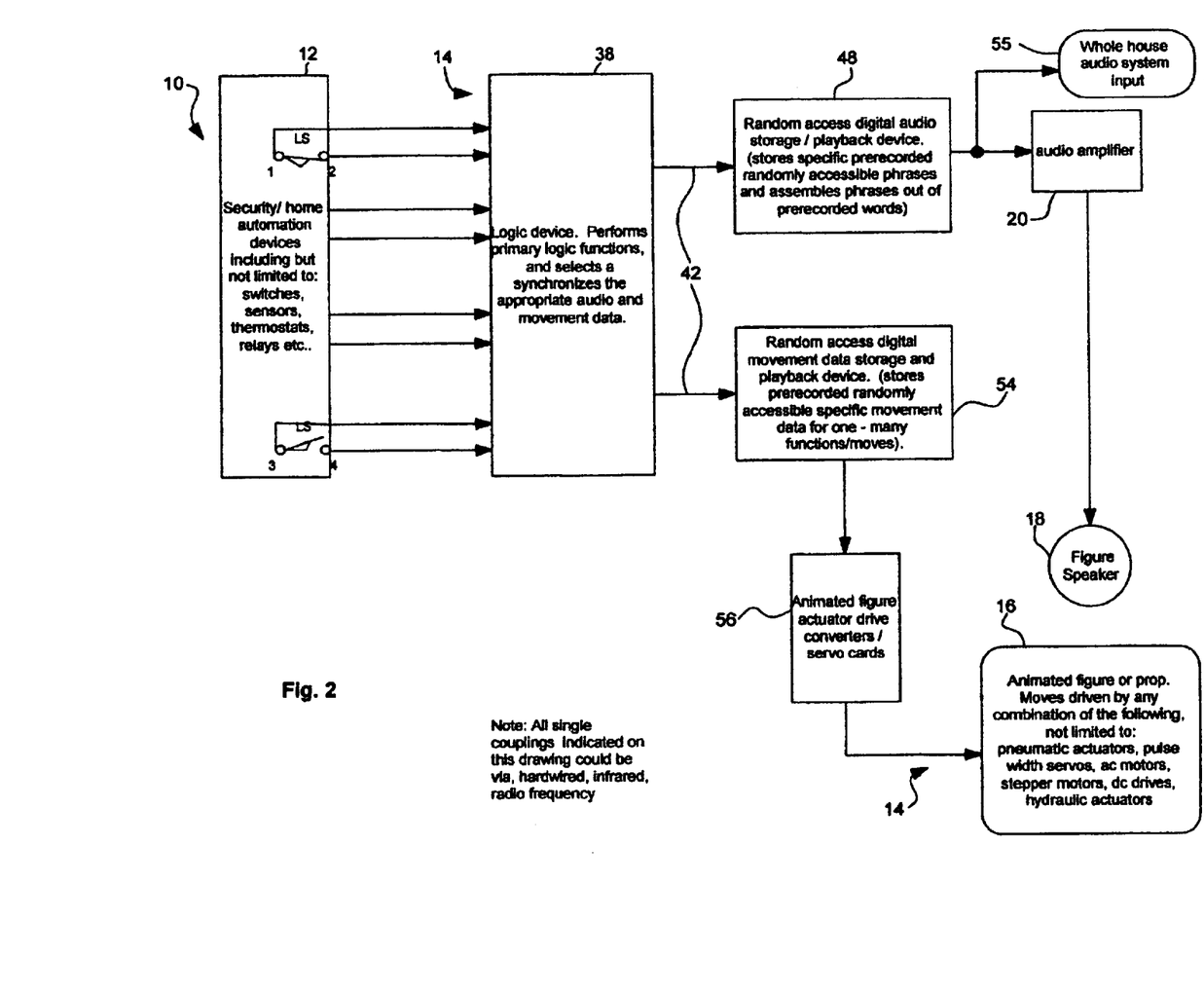
FIG. 2 is a block diagram of an alternative embodiment of the present invention having direct connections to the sensors and with no voice recognition.
Figure 2B:
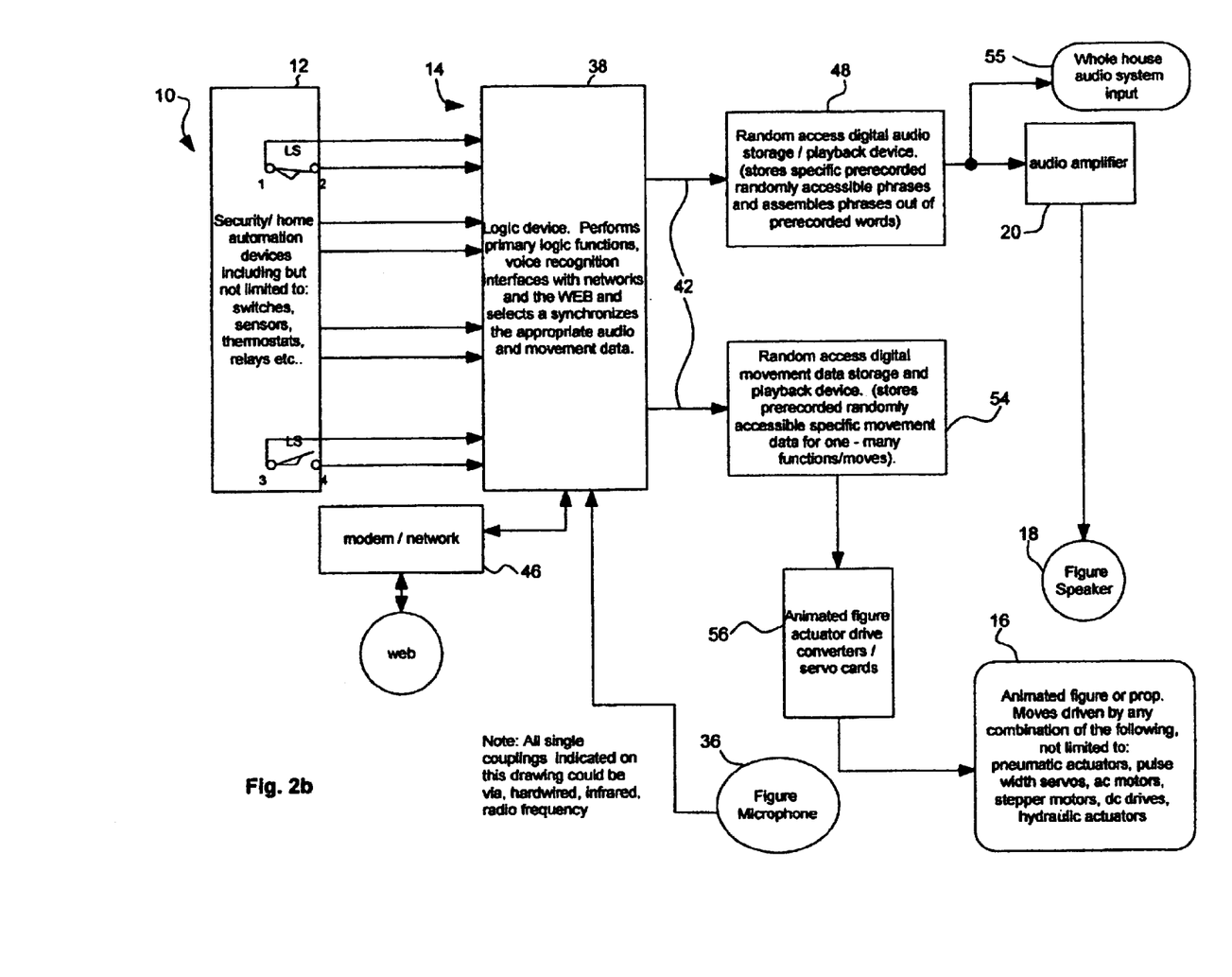
FIG. 2b is a block diagram of an alternative embodiment of similar to that shown in FIG. 2 wherein the logic controlling device has voice recognition capabilities and is coupled to the internet.
Figure 3:
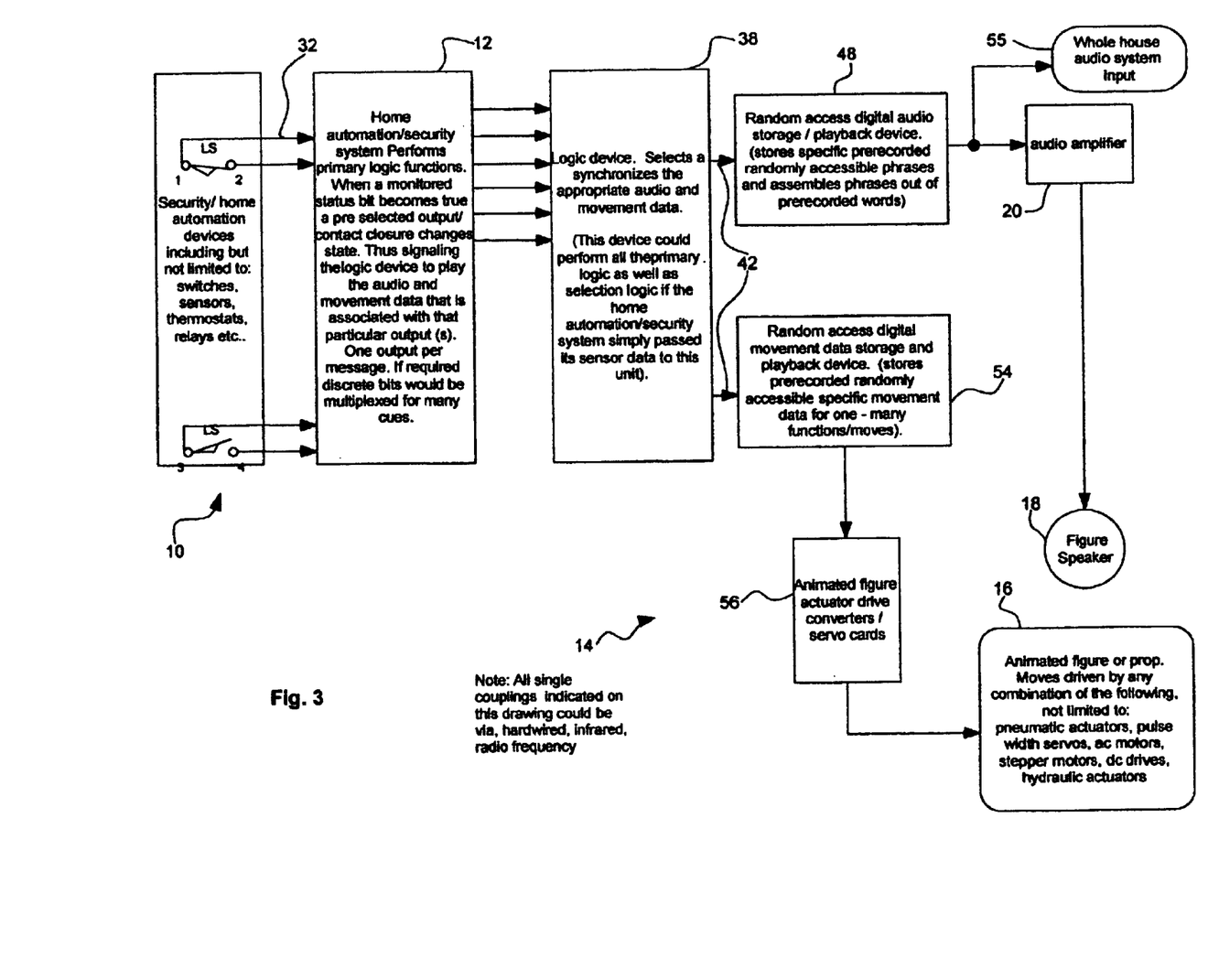
FIG. 3 is a block diagram of an alternative embodiment of the present invention having direct connections to the home control system through discretes and no voice recognition.
Figure 4:
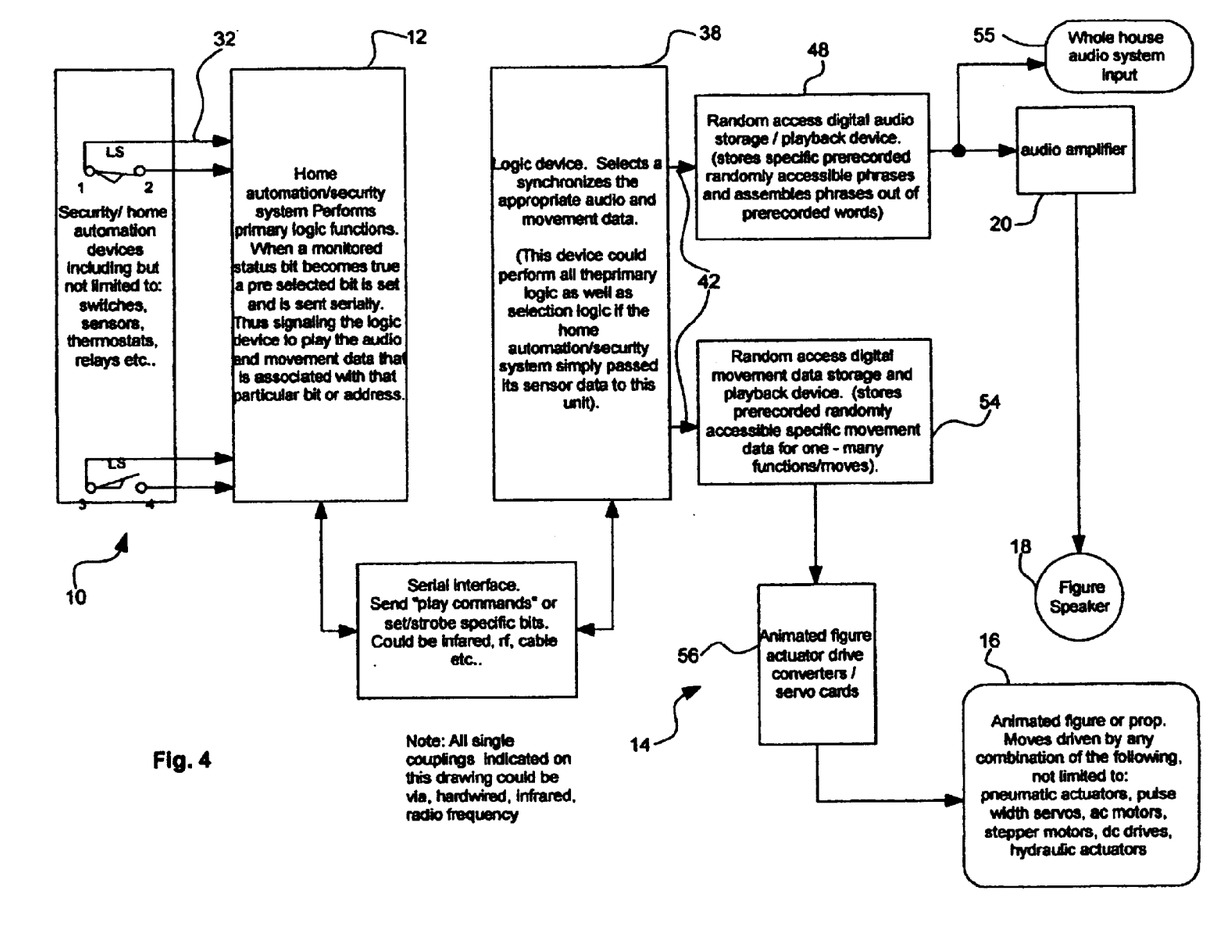
FIG. 4 is a block diagram of an alternative embodiment of the present invention having direct connections to the home control system through serial communication and with no voice recognition.
Figure 5:
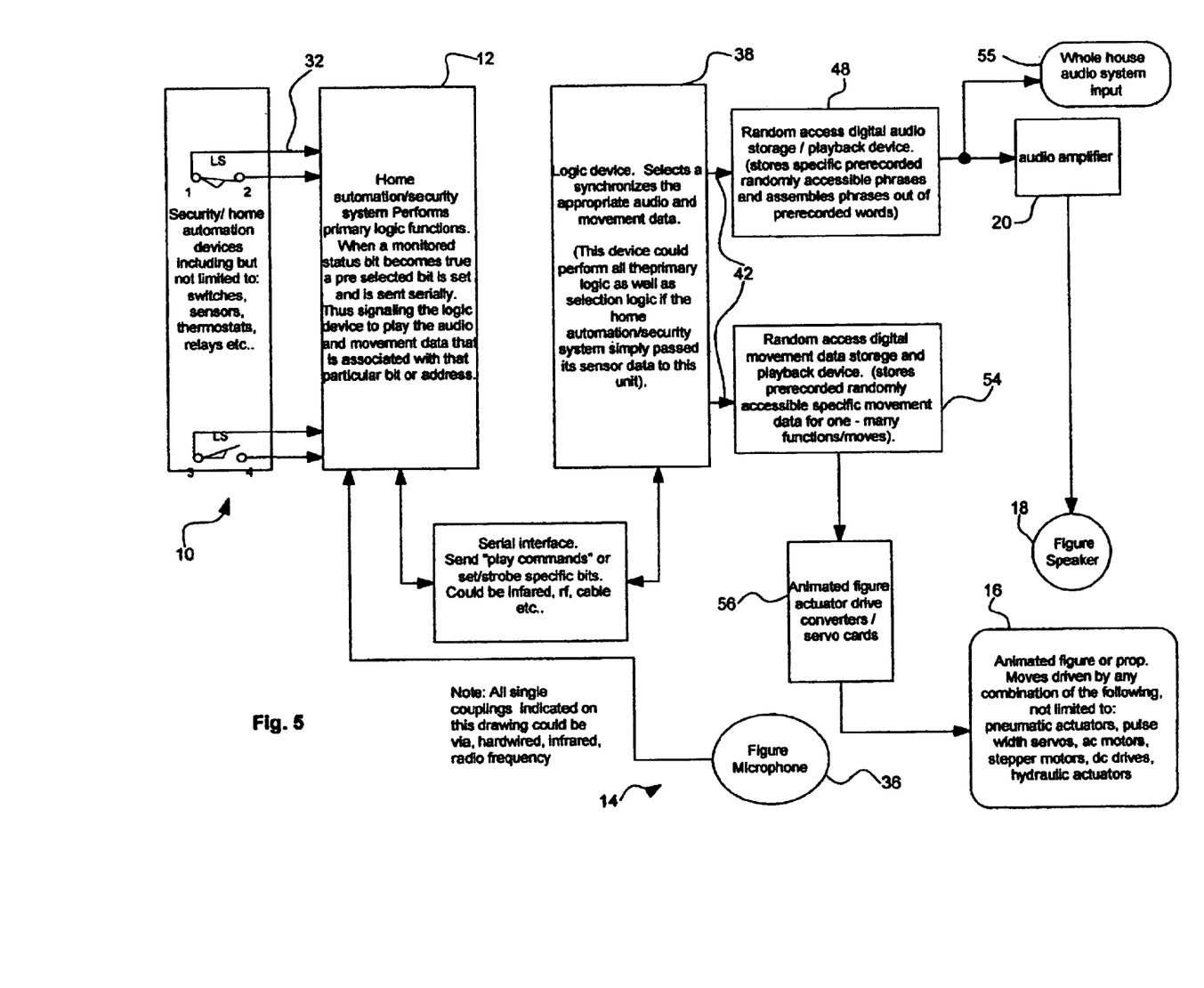
FIG. 5 is a block diagram of an alternative embodiment of the present invention having direct connections to the home control system through serial communication and with voice recognition.
Figure 6:
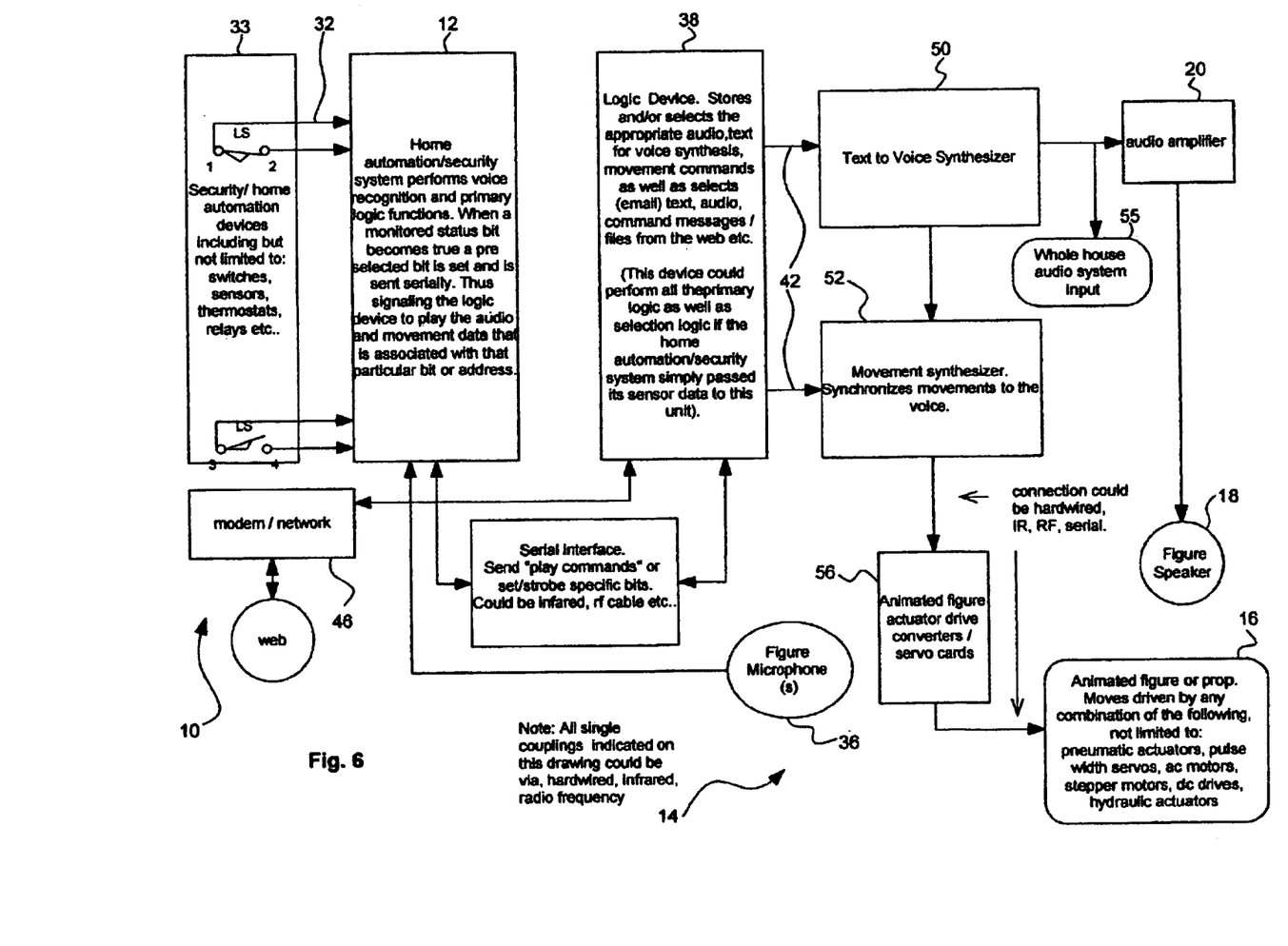
FIG. 6 is a block diagram of an alternative embodiment of the present invention having direct connections with the home control system with serial communication and with voice recognition and voice synthesis.
Figure 7:
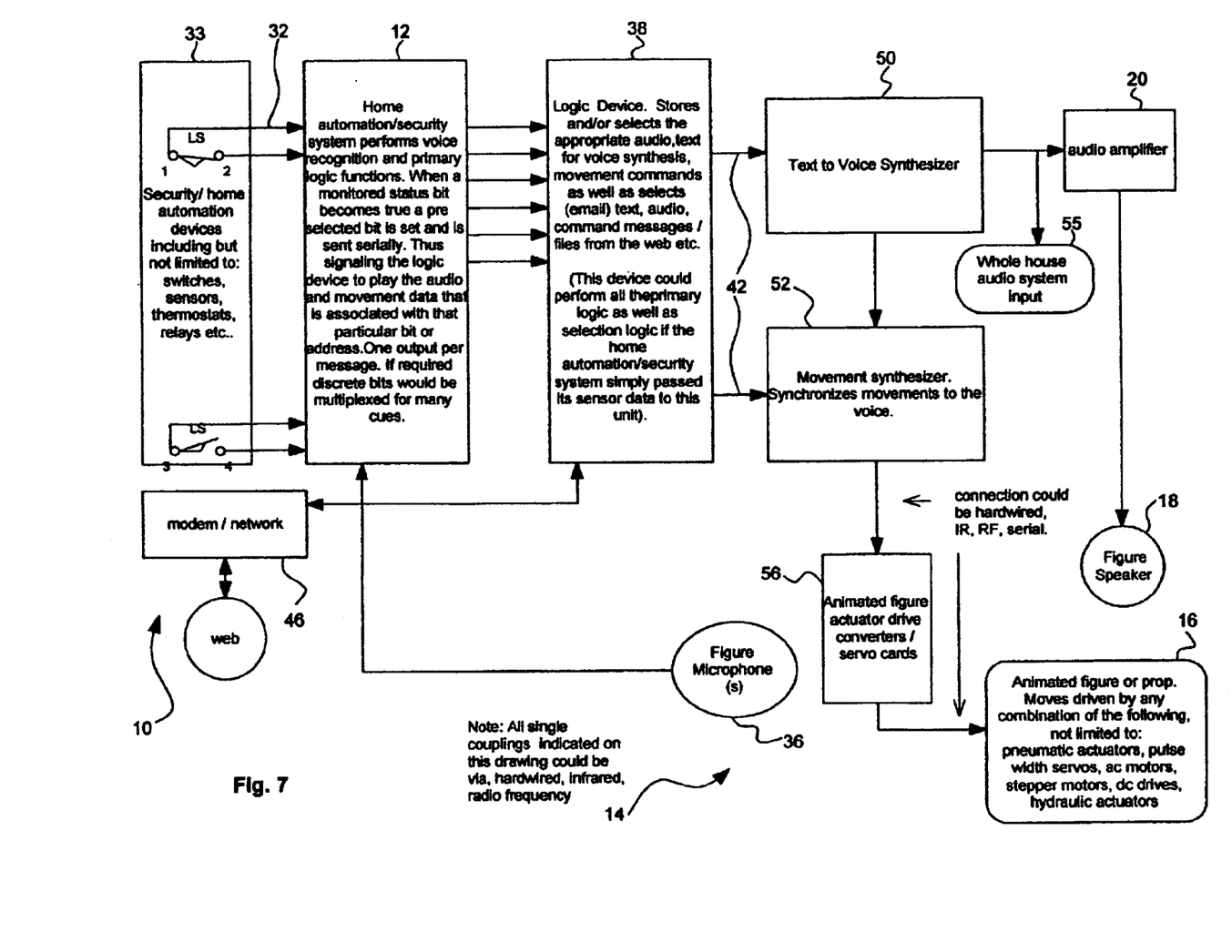
FIG. 7 is a block diagram of an alternative embodiment of the present invention having direct connections with the home control system through discretes and with voice recognition and voice synthesis.

The embodiment shown in FIG. 2 shows direct connections to the sensors and the logic controlling device and the character utilizing only prerecorded words and motions. FIG. 2b is a block diagram of an alternative embodiment similar to that shown in FIG. 2 wherein the logic controlling device is further coupled to a microphone and a modem/network and has voice recognition capabilities and is coupled to the internet. The embodiment shown in FIG. 3 has discrete connections between the home control system and the logic controlling device and the character utilizing only prerecorded words and motions. The embodiment shown in FIG. 4 has serial communication between the home control system and the logic controlling system with the character having no voice recognition capabilities. FIG. 5 shows and an alternative embodiment wherein the home control system is serial connected with the logic controlling device and the character has voice recognition capabilities. FIG. 6 shows an alternative embodiment with serial connections between the home control system and the logic controlling device with the character having voice recognition and voice synthesis. Finally, FIG. 7 shows an alternative embodiment wherein the home control system is coupled to the logic controlling device with discretes and character having voice recognition and voice synthesis.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A home control system with an interface assembly in the form of a speaking, moving, three dimensional animated character/prop operable in response to sensed signals comprising in combination:

a three dimensional animatronic character/prop having a plurality of speakers, motors and actuators adapted to deliver system status messages and requested information to a user verbally as a function of input signals from a home control system;

the home control system comprising a home security system and a home automation system, the home control system adapted to control and maintain an environment associated with a building as well as survey for occurrences, the home control system having a plurality of inputs from various sensors, relays, thermostats, and user controls, the home control system further having a plurality or outputs to convey messages relating to the environment to the user;

a microphone operatively coupled to the home control system and adapted to offer the user hands free operation of the home control system;

a logic controlling device having a plurality of inputs and a plurality of outputs, the logic controlling device adapted to configure and synchronize message request signals from the home control system with appropriate prerecorded audible words and movement commands from random access storage devices as required to convey messages relating to the environment to the user;

a modem/network connection operatively coupled to the logic controlling device and adapted to provide the user access to the worldwide web, email, and networks;

an audio component operatively coupled to the logic controlling device, to the character/prop and a movement synthesizer, whereby the audio component produces choreographed word phrases upon receipt of a signal from the logic controlling device and transmits the word phrases to the character/prop to perform, the audio component having text reading capabilities enabling it to convert text into words, the movement synthesizer being operatively coupled to the audio component and a drive converter assembly, the movement synthesizer adapted to produce a choreographed command signal upon receipt of the word phrase; and a drive converter assembly operatively coupled to the movement synthesizer and adapted to receive the command signals, the drive converter assembly further being operatively coupled to the character/prop and adapted to transmit drive signals to the character/prop to perform.

2. An interface assembly in the form of a speaking, moving, three dimensional animated character/prop operable in response to sensed signals comprising in combination:

an animated character/prop having at least one speaker for generating language and mechanisms for generating movement, the language and movement being correlated;

a logic controlling device having a plurality of inputs and a plurality of outputs, the logic controlling device adapted to configure and synchronize message request signals from sensors, relays, thermostats, and user controls with the appropriate audible words and movement commands from generating devices as required to convey messages relating to the environment to a user;

an audio component adapted to receive output signals from the logic controlling device to actuate the speaker;

a movement component adapted to receive output signals from the logic controlling device to actuate the mechanisms for generating movement; and a drive converter assembly operatively coupled to the movement component and the character/prop and adapted to convert and transfer signals therebetween.

3. The interface assembly as set forth in claim 2 wherein the output signals from the logic controlling device separately provide inputs to the audio component and the movement component.

4. The interface assembly as set forth in claim 3 wherein the audio component is a random access digital audio storage, assembly and playback device and the movement component is a random access digital movement data storage, assembly and playback device.

5. The interface assembly as set forth in claim 2 wherein the audio component has text reading capabilities enabling it to convert text into word phrases and the movement component is a movement synthesizer adapted to produce a choreographed command signal upon receipt of the word phrases.

6. The interface assembly as set forth in claim 5 wherein the output signals from the logic controlling device provide input to the audio component with subsequent signals from the audio component being fed to the movement component.

7. The interface assembly as set forth in claim 2 and further including a microphone operatively coupled to the logic controlling device and adapted to offer the user hands free operation.

8. The interface assembly as set forth in claim 2 wherein the input signals received by the logic controlling device are generated by a home control system, such home control system being adapted to control and maintain an environment associated with a building as well as survey for occurrences, the home control system having a plurality of inputs from sensors, relays, thermostats, and user controls, the home control system further having a plurality of outputs to convey messages relating to the environment to the user.

9. The interface assembly as set forth in claim 8 wherein the home control system is a home security system.

10. The interface assembly as set forth in claim 8 wherein the home control system is a home automation system.

11. The interface assembly as set forth in claim 8 wherein the home control system comprises a home security system and a home automation system.

12. The interface assembly as set forth in claim 2 wherein the operative coupling between the home control system and the logic controlling device is a serial connection.

13. The interface assembly as set forth in claim 2 wherein the operative coupling between the home control system, and the logic controlling device is discrete trigger connections.

14. The interface assembly as set forth in claim 2 wherein the operative coupling between the home control system and the logic controlling device is a parallel connection.

15. The interface assembly as set forth in claim 2 wherein one of the inputs operatively coupled to the logic controlling device is a modem/LAN adapted to provide the user with access to the worldwide web, email, and networks.

16. The interface assembly as set forth in claim 2 wherein the audio component has text reading capabilities enabling it to convert prerecorded typed messages and live text into words for the character/prop to speak.

17. The interface assembly as set forth in claim 2 wherein the audio component has access to prerecorded audio messages.

18. The interface assembly as set forth in claim 2 wherein the audio component has text reading capabilities and access to prerecorded audio messages.

19. The interface assembly as set forth in claim 2 wherein a home control system simply passes its data to the logic controlling device, the logic controlling device adapted to perform all selection logic.

* * * * *